US012631855B2

(12) United States Patent
Teranishi

(10) Patent No.: US 12,631,855 B2
(45) Date of Patent: May 19, 2026

(54) OPTICAL IMAGING SYSTEM

(71) Applicant: AAC OPTICS ( CHANGZHOU ) CO., LTD., Changzhou (CN)

(72) Inventor: Takaaki Teranishi, Osaka (JP)

(73) Assignee: AAC OPTICS (CHANGZHOU) CO., LTD., Changzhou (CN)

( * ) Notice: Subject to any disclaimer, the term of this patent is extended or adjusted under 35 U.S.C. 154(b) by 370 days.

(21) Appl. No.: 18/404,809

(22) Filed: Jan. 4, 2024

(65) Prior Publication Data

US 2024/0345366 A1    Oct. 17, 2024

(30) Foreign Application Priority Data

Apr. 11, 2023    (CN) ......................... 202310386288.X

(51) Int. Cl.
*G02B 9/64* (2006.01)

(52) U.S. Cl.
CPC ..................................... *G02B 9/64* (2013.01)

(58) Field of Classification Search
CPC ...... G02B 9/64; G02B 13/00; G02B 13/0045; G02B 13/18; G02B 13/0015; G02B 1/00; G02B 27/0031
See application file for complete search history.

(56) References Cited

U.S. PATENT DOCUMENTS

| 2012/0314303 | A1* | 12/2012 | Liu | G02B 13/06 |
| | | | | 359/717 |
| 2013/0100544 | A1* | 4/2013 | Liu | G02B 13/04 |
| | | | | 359/753 |
| 2016/0170175 | A1* | 6/2016 | Chang | G02B 13/0045 |
| | | | | 359/708 |
| 2017/0336607 | A1* | 11/2017 | Nakano | G02B 13/146 |
| 2023/0333364 | A1* | 10/2023 | Epple | G02B 25/001 |

* cited by examiner

*Primary Examiner* — William R Alexander
*Assistant Examiner* — Mackenzi Bourquine
(74) *Attorney, Agent, or Firm* — Wiersch Law Group

(57) ABSTRACT

The present disclosure discloses an optical imaging system including twelve lenses, sequentially from the object side to the image side. The optical imaging system satisfies following conditions satisfying: $-40.00 \leq f9/d17 \leq -5.00$; $2.00 \leq d23/d22 \leq 18.00$; $-6.51 \leq f12'/f34 \leq -1.00$; $4.00 \leq IH*f/TTL \leq 15.00$, where f9 denotes a focal length of the ninth lens; d17 denotes an on-axis thickness of the ninth lens; d23 denotes an on-axis thickness of the twelfth lens; d22 denotes an on-axis distance from the image-side surface of the eleventh lens to the object-side surface of the twelfth lens; f12' denotes a combined focal length of the first lens and the second lens; f34 denotes a combined focal length of the third lens and the fourth lens; f, IH, TTL respectively denotes a focal length, an image height and a total optical length of the optical imaging system.

16 Claims, 8 Drawing Sheets

10

Lateral color

Field curvature                    Distortion

30

40

Longitudinal aberration

OPTICAL IMAGING SYSTEM

TECHNICAL FIELD

The present disclosure relates to the field of optical lenses, and particularly to an optical imaging system suitable for industrial line scanning lenses.

BACKGROUND

With the rapid development of industrial automation, machine vision has been widely used in industrial automation production, assembly line inspection, logistics sorting, medicine, scientific research and other fields, for detection, discrimination and measurement of target parts, to reduce or eliminate the misjudgment caused by manual operation, and significantly improve measurement accuracy and efficiency. Optical imaging systems such as industrial line scanning lenses play an important role as the "eyes" of machine vision. In the application scenarios such as defect detection of LCD (liquid crystal display) screens and circuit lines of mobile phone touch screens in the manufacturing of electronic products, the requirements for industrial line scanning lenses are becoming higher and higher.

At present, in order to obtain better imaging quality, the optical imaging system for industrial line scanning lenses mostly adopts a multi-piece lens structure. Moreover, with the development of technology and the increasing demand of users for diversified needs, in the case where the pixel area of the photosensitive device continues to shrink and the requirements for imaging quality of the system continue to increase, the twelve-piece lens structure gradually appears in the design of industrial line scanning lenses, but there are still insufficient optical performance, large volume, and inability to change the depth of field during measurement, and other defects. There is an urgent need for a telephoto camera lens with excellent optical characteristics, small volume, fully corrected aberrations, and variable aperture.

SUMMARY

To solve the above problems, the purpose of the present disclosure is to provide an optical imaging system that meets the design requirements of variable aperture, miniaturization, long focal length, and low distortion while having excellent optical performance.

To solve the above technical problems, an embodiment of the present disclosure provides an optical imaging system, which includes from an object side to an image side: a first lens; a second lens; a third lens having a negative refractive power; a fourth lens having a positive refractive power; a fifth lens having a positive refractive power; a sixth lens having a negative refractive power; a seventh lens having a positive refractive power; an eighth lens having a negative refractive power; a ninth lens having a negative refractive power; a tenth lens having a positive refractive power; an eleventh lens having a negative refractive power; and a twelfth lens; wherein the optical imaging system satisfies following conditions:

$$-40.00 \le f9/d17 \le -5.00; 2.00 \le d23/d22 \le 18.00;$$

$$-6.51 \le f12'/f34 \le -1.00; 4.00 \le IH*f/TTL \le 15.00;$$

where
f denotes a focal length of the optical imaging system;
f9 denotes a focal length of the ninth lens;
d17 denotes an on-axis thickness of the ninth lens;
d23 denotes an on-axis thickness of the twelfth lens;
d22 denotes an on-axis distance from the image-side surface of the eleventh lens to
the object-side surface of the twelfth lens;
f12' denotes a combined focal length of the first lens and the second lens;
f34 denotes a combined focal length of the third lens and the fourth lens;
IH denotes an image height of the optical imaging system; and
TTL denotes a total optical length of the optical imaging system.

As an improvement, the optical imaging system further satisfies following conditions:

$$45.00 \le v5 - v6 \le 80.00;$$

where
v5 denotes an abbe number of the fifth lens; and
v6 denotes an abbe number of the sixth lens.

As an improvement, the optical imaging system further satisfies following conditions:

$$-6.00 \le R11/f6 \le -1.00;$$

where
R11 denotes a curvature radius of the image-side surface of the sixth lens; and
f6 denotes a focal length of the sixth lens.

As an improvement, an object-side surface of the first lens is concave in a paraxial region; and the optical imaging system further satisfies following conditions:

$$-2.11 \le f1/f \le 0.69; -4.54 \le (R3+R4)/(R3-R4) \le 6.20;$$

$$0.00 \le d1/TTL \le 0.01;$$

where
f1 denotes a focal length of the first lens;
R3 denotes a curvature radius of the object-side surface of the first lens;
R4 denotes a curvature radius of a bonding surface of the first lens and the second lens; and
d1 denotes an on-axis thickness of the first lens.

As an improvement, an image-side surface of the second lens is convex in a paraxial region; and the optical imaging system further satisfies following conditions:

$$-1.18 \le f2/f \le 1.65; -5.12 \le (R4+R5)/(R4-R5) \le 13.33;$$

$$0.01 \le d3/TTL \le 0.02;$$

where
f2 denotes a focal length of the second lens;
R4 denotes a curvature radius of a bonding surface of the first lens and the second lens;

R5 denotes a curvature radius of the image-side surface of the second lens; and d3 denotes an on-axis thickness of the second lens.

As an improvement, an object-side surface of the third lens is convex in a paraxial region; and the optical imaging system further satisfies following conditions:

$$-3.64 \le f3/f \le -0.34; -0.82 \le (R6 + R7)/(R6 - R7) \le 8.49;$$

$$0.00 \le d5/TTL \le 0.01;$$

where f3 denotes a focal length of the third lens;

R6 denotes a curvature radius of the object-side surface of the third lens;

R7 denotes a curvature radius of a bonding surface of the third lens and the fourth lens; and As an improvement, an object-side surface of the fourth lens is convex in a paraxial region, an image-side surface of the fourth lens is convex in a paraxial region; and the optical imaging system further satisfies following conditions:

$$0.18 \le f4/f \le 1.42; -0.69 \le (R7 + R8)/(R7 - R8) \le 0.51;$$

$$0.02 \le d7/TTL \le 0.05;$$

where f4 denotes a focal length of the fourth lens;

R7 denotes a curvature radius of a bonding surface of the third lens and the fourth lens; and R8 denotes a curvature radius of an image-side surface of the fourth lens;

d7 denotes an on-axis thickness of the fourth lens.

As an improvement, an object-side surface of the fifth lens is convex in a paraxial region; and the optical imaging system further satisfies following conditions:

$$0.28 \le f5/f \le 3.02; -2.07 \le (R9 + R10)/(R9 - R10) \le -0.30;$$

$$0.01 \le d9/TTL \le 0.03;$$

where f5 denotes a focal length of the fifth lens;

R9 denotes a curvature radius of an object-side surface of the fifth lens;

R10 denotes a curvature radius of a bonding surface of the fifth lens and the sixth lens; and d9 denotes an on-axis thickness of the fifth lens.

As an improvement, a an image-side surface of the sixth lens is concave in a paraxial region; and the optical imaging system further satisfies following conditions:

$$-3.57 \le f6/f \le -0.62; -1.50 \le (R10 + R11)/(R10 - R11) \le 1.76;$$

$$0.00 \le d11/TTL \le 0.01;$$

where f6 denotes a focal length of the sixth lens;

R10 denotes a curvature radius of a bonding surface of the fifth lens and the sixth lens;

R11 denotes a curvature radius of an image-side surface of the sixth lens; and d11 denotes an on-axis thickness of the sixth lens.

As an improvement, an object-side surface of the seventh lens is convex in a paraxial region; and the optical imaging system further satisfies following conditions:

$$0.08 \le f7/f \le 0.92; -2.51 \le (R12 + R13)/(R12 - R13) \le 1.09;$$

$$0.01 \le d13/TTL \le 0.02;$$

where f7 denotes a focal length of the seventh lens;

R12 denotes a curvature radius of an object-side surface of the seventh lens;

R13 denotes a curvature radius of a bonding surface of the seventh lens and the eighth lens; and d13 denotes an on-axis thickness of the seventh lens.

As an improvement, the optical imaging system further satisfies following conditions:

$$-1.47 \le f8/f \le -0.09; -3.10 \le (R13 + R14)/(R13 - R14) \le 1.70;$$

$$0.00 \le d15/TTL \le 0.01;$$

where f8 denotes a focal length of the eighth lens;

R13 denotes a curvature radius of a bonding surface of the seventh lens and the eighth lens;

R14 denotes a curvature radius of the image-side surface of the eighth lens; and d15 denotes an on-axis thickness of the eighth lens.

As an improvement, the optical imaging system further satisfies following conditions:

$$-8.64 \le f9/f \le -0.36; -3.07 \le (R15 + R16)/(R15 - R16) \le 6.41;$$

$$0.00 \le d17/TTL \le 0.01$$

where f9 denotes a focal length of the ninth lens;

R15 denotes a curvature radius of the object-side surface of the ninth lens; and R16 denotes a curvature radius of the image-side surface of the ninth lens.

As an improvement, an image-side surface of the tenth lens is convex in a paraxial region; and the optical imaging system further satisfies following conditions:

$$0.24 \le f10/f \le 1.33; -0.75 \le (R17 + R18)/(R17 - R18) \le 4.17;$$

$$0.01 \le d19/TTL \le 0.04;$$

where f10 denotes a focal length of the ninth lens;

R17 denotes a curvature radius of the object-side surface of the tenth lens;

R18 denotes a curvature radius of the image-side surface of the tenth lens; and d19 denotes an on-axis thickness of the tenth lens.

As an improvement, an object-side surface of the eleventh lens is concave in a paraxial region; and the optical imaging system further satisfies following conditions:

$$-3.56 \le f11/f \le -0.59; -9.90 \le (R19+R20)/(R19-R20) \le -0.20;$$

$$0.00 \le d21/TTL \le 0.01;$$

where f11 denotes a focal length of the eleventh lens;

R19 denotes a curvature radius of the object-side surface of the eleventh lens;

R20 denotes a curvature radius of the image-side surface of the eleventh lens; and d21 denotes an on-axis thickness of the eleventh lens.

As an improvement, an image-side surface of the twelfth lens is convex in a paraxial region; and the optical imaging system further satisfies following conditions:

$$-2.95 \le f12/f \le 2.61; -2.34 \le (R21+R22)/(R21-R22) \le 3.24;$$

$$0.00 \le d23/TTL \le 0.01;$$

where f12 denotes a focal length of the twelfth lens;

R21 denotes a curvature radius of the object-side surface of the twelfth lens; and R22 denotes a curvature radius of the image-side surface of the twelfth lens.

As an improvement, the first lens, the second lens, the third lens, the fourth lens, the fifth lens, the sixth lens, the seventh lens, the eighth lens, the ninth lens, the tenth lens, the eleventh lens and the twelfth lens are all made of glass.

The beneficial effect of the present disclosure is that the optical imaging system according to the present disclosure be applied to an industrial line scan optical imaging system, and has excellent optical characteristics, and has the characteristics of variable aperture, long focal length, miniaturization, and low distortion, and can change the depth of field during measurement.

BRIEF DESCRIPTION OF DRAWINGS

In order to more clearly describe the technical solutions in the embodiments of the present disclosure, the following briefly describes the drawings used in the description of the embodiments. Obviously, the following drawings are only some embodiments of the present disclosure, and those skilled in the art can obtain other drawings without creative efforts, among which.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers understand the present disclosure better. However, even without these technical details and any changes and modifications based on the following embodiments, technical solutions required to be protected by the present disclosure can be implemented.

Embodiment 1

Figure 1:
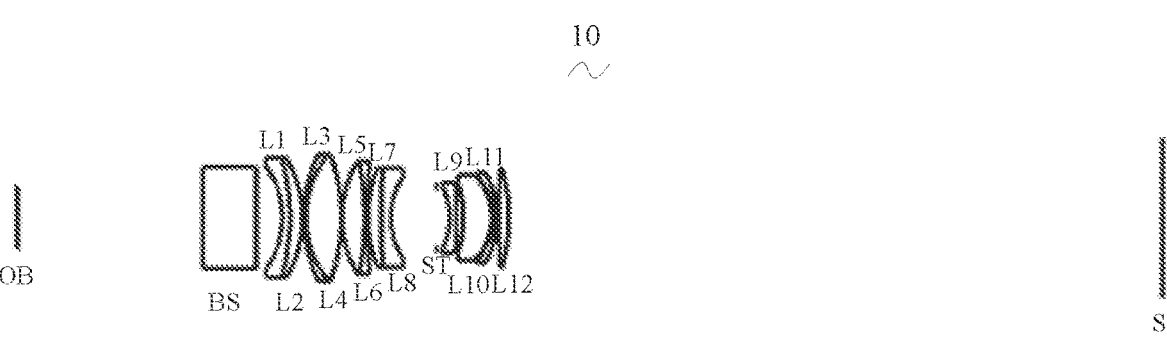
FIG. 1 is a schematic diagram of a structure of an optical imaging system 10 according to Embodiment 1 of the present disclosure.

Referring to the accompanying drawings, the present disclosure provides an optical imaging system 10. FIG. 1 shows the optical imaging system 10 of Embodiment 1 of the present disclosure, the optical imaging system 10 includes twelve lenses sequentially from an object side to an image side. Specifically, the optical imaging system 10, sequentially from the object side to the image side, includes: an object surface OB, a beam splitter BS, a first lens L1, a second lens L2, a third lens L3, a fourth lens L4, a fifth lens L5, a sixth lens L6, a seventh lens L7, an eighth lens L8, an aperture ST, a ninth lens L9, a tenth lens L10, an eleventh lens L11, a twelfth lens L12, and an image surface Si.

In this embodiment, the first lens L1 is made of glass, the second lens L2 is made of glass, the third lens L3 is made of glass, the fourth lens L4 is made of glass, the fifth lens L5 is made of glass, the sixth lens L6 is made of glass, the seventh lens L7 is made of glass, the eighth lens L8 is made of glass, the ninth lens L9 is made of glass, the tenth lens L10 is made of glass, the eleventh lens L11 is made of glass, and the twelfth lens L12 is made of glass.

In this embodiment, a focal length of the ninth lens L9 is defined as f9, an on-axis thickness of the ninth lens L9 is defined as d17, and the optical imaging system should satisfy a condition of $-40.00 \leq f9/d17 \leq -5.00$, which specifies the range of the ratio of the focal length f9 of the ninth lens L9 to the on-axis thickness d17, it is possible to ensure that the ninth lens L9 has sufficient refractive power while maintaining a reasonable axial thickness, which is helpful for the processing and forming of the lens.

An on-axis thickness of the twelfth lens L12 is defined as d23, an on-axis distance from the image-side surface of the eleventh lens L11 to the object-side surface of the twelfth lens L12, and the optical imaging system should satisfy a condition of $2.00 \leq d23/d22 \leq 18.00$. Within the specified range, it can avoid assembly interference caused by the small spacing between lenses, thereby improving the assembly yield. It can also balance the lens thickness to avoid uneven molding caused by excessive lens thickness, and can effectively reduce sensitivity.

A combined focal length of the first lens L1 and the second lens L2 is defined as f12', a combined focal length of the third lens L3 and the fourth lens L4 is defined as f34. By reasonably distributing the focal lengths of the first two lens groups, it is beneficial to correct the image dispersion and distortion of the lens, so that an absolute value of distortion satisfies $|\text{Distortion}| \leq 0.85\%$, and reduce the possibility of vignetting.

A focal length of the optical imaging system 10 is defined as f, an image height of the optical imaging system 10 is defined as IH, a total optical length of the optical imaging system 10 is defined as TTL, and the optical imaging system should satisfy a condition of $4.00 \leq IH*f/TTL \leq 15.00$. Within the conditional range, the total length of the lens can be controlled while ensuring the imaging range reaches the state.

An abbe number of the fifth lens L5 is defined as v5, an abbe number of the sixth lens L6 is defined as v6, and the optical imaging system should satisfy a condition of $45.00 \leq v5-v6 \leq 80.00$. Within this range, the conditional formula can effectively correct the chromatic aberration of the system, with $|LC| \leq 4$ μm.

A curvature radius of the image-side surface of the sixth lens L6 is defined as R11, a focal length of the sixth lens L6 is defined as f6, and the optical imaging system should satisfy a condition of $-6.00 \leq R11/f6 \leq -1.00$. By reasonably distributing the focal lengths of the lenses and controlling the surface shapes, it is beneficial to the smooth transition of light between the lens groups, correcting image aberrations to achieve high resolution, while also reducing the sensitivity of tolerance issues such as tilting and off-center of the lenses during the assembly process.

In this embodiment, an object-side surface of the first lens L1 is concave in a paraxial region, an image-side surface of the first lens L1 is convex in a paraxial region. The first lens L1 has a negative refractive force. In other optional implementation methods, the object-side surface and image-side surface of the first lens L1 can also be set to other concave and convex distributions, and the first lens L1 can also have positive refractive power.

A focal length of the optical imaging system 10 is defined as f, a focal length of the first lens L1 is defined as f1, and the optical imaging system should satisfy a condition of $-2.11 \leq f1/f \leq 0.69$, which specifies the negative refractive power of the first lens L1. When the value exceeds the upper limit specified value, although it is beneficial for the lens to develop towards miniaturization, the negative refractive power of the first lens L1 will be too strong, making it difficult to correct image aberrations. Conversely, when the value exceeds the lower limit specified value, the negative refractive power of the first lens will become too weak, making it difficult to control the lens thickness and difficult for the lens to develop towards miniaturization.

A curvature radius of the object-side surface of the first lens L1 is defined as R3, a curvature radius of a bonding surface of the first lens L1 and the second lens L2 is defined as R4, and the optical imaging system should satisfy a condition of $-4.54 \leq (R3+R4)/(R3-R4) \leq 6.20$. By reasonably controlling the shape of the first lens L1, the first lens L1 can effectively correct the system spherical aberration. Preferably, it meets $-2.84 \leq (R3+R4)/(R3-R4) \leq 4.96$.

An on-axis thickness of the first lens L1 is defined as d1, a total optical length of the optical imaging system 10 is defined as TTL, and the optical imaging system should satisfy a condition of $0.00 \leq d1/TTL \leq 0.01$. Within the conditional range, it is beneficial to control the lens thickness and the total length of the lens. Preferably, it meets $d1/TTL=0.01$.

In this embodiment, an object-side surface of the second lens L2 is concave in a paraxial region, an image-side surface of the second lens L2 is convex in a paraxial region, and the second lens L2 has a positive refractive power. In other optional implementation methods, the object-side surface and image-side surface of the second lens L2 can also be set to other concave and convex distributions, and the second lens L2 can also have negative refractive power.

A focal length of the optical imaging system 10 is defined as f, a focal length of the second lens L2 is defined as f2, and the optical imaging system should satisfy a condition of $-1.18 \leq f2/f \leq 1.65$. By controlling the positive or negative focal length of the second lens L2 within a reasonable range, it is beneficial to correct the aberrations of the optical system. Preferably, it meets $-0.74 \leq f2/f \leq 1.32$.

A curvature radius of a bonding surface of the first lens L1 and the second lens L2 is defined as R4, a curvature radius of the image-side surface of the second lens L2 is defined as R5, and the optical imaging system should satisfy a condition of $-5.12 \leq (R4+R5)/(R4-R5) \leq 13.33$, which specifies a shape of the second lens L2. When within this range, as the lens develops towards miniaturization, it is beneficial to correct the axial chromatic aberration. Preferably, it meets $-3.20 \leq (R4+R5)/(R4-R5) \leq 10.66$.

An on-axis thickness of the second lens L2 is defined as d3, a total optical length of the optical imaging system 10 is defined as TTL, and the optical imaging system should satisfy a condition of $0.01 \leq d3/TTL \leq 0.02$. Within the conditional range, it is beneficial to control the lens thickness and the total length of the lens. Preferably, it meets $d3/TTL=0.01$.

In this embodiment, an object-side surface of the third lens L3 is convex in a paraxial region, an image-side surface of the third lens L3 is concave in a paraxial region, and the third lens L3 has a negative refractive power. In other optional implementation methods, the object-side surface and image-side surface of the third lens L3 can also be set to other concave and convex distributions.

A focal length of the optical imaging system 10 is defined as f, a focal length of the third lens L3 is defined as f3, and the optical imaging system should satisfy a condition of $-3.64 \leq f3/f \leq -0.34$. By reasonably distributing the focal lengths, the system is enabled to have better imaging quality and lower sensitivity. Preferably, it meets $-2.27 \leq f3/f \leq -0.43$.

A curvature radius of the object-side surface of the third lens L3 is defined as R6, a curvature radius of a bonding surface of the third lens L3 and the fourth lens L4 is defined as R7, and the optical imaging system should satisfy a condition of $-0.82 \le (R6+R7)/(R6-R7) \le 8.49$, which specifies a shape of the third lens L3 and is beneficial for the processing of the third lens L3. Within the specified range of the conditional formula, it can reduce the degree of light deviation passing through the lens and effectively reduce image aberrations. Preferably, it meets $-0.51 \le (R6+R7)/(R6-R7) \le 6.79$.

An on-axis thickness of the third lens L3 is defined as d5, a total optical length of the optical imaging system 10 is defined as TTL, and the optical imaging system should satisfy a condition of $0.00 \le d5/TTL \le 0.01$. Within the conditional range, it is beneficial to control the lens thickness and the total length of the lens. Preferably, it meets d5/TTL=0.01.

In this embodiment, an object-side surface of the fourth lens L4 is convex in a paraxial region, an image-side surface of the fourth lens L4 is convex in a paraxial region, and the fourth lens L4 has a positive refractive power.

A focal length of the optical imaging system 10 is defined as f, a focal length of the fourth lens L4 is defined as f4, and the optical imaging system should satisfy a condition of $0.18 \le f4/f \le 1.42$. By reasonably distributing the focal lengths, the system is enabled to have better imaging quality and lower sensitivity. Preferably, it meets $0.29 \le f4/f \le 1.13$.

A curvature radius of a bonding surface of the third lens L3 and the fourth lens L4 is defined as R7, a curvature radius of an image-side surface of the fourth lens L4 is defined as R8, and the optical imaging system should satisfy a condition of $-0.69 \le (R7+R8)/(R7-R8) \le 0.51$, which specifies a shape of the fourth lens L4. When within this range, as the lens develops towards miniaturization, it is beneficial to correct the image aberrations at off-axis angles. Preferably, it meets $-0.43 \le (R7+R8)/(R7-R8) \le 0.40$.

An on-axis thickness of the fourth lens L4 is defined as d7, a total optical length of the optical imaging system 10 is defined as TTL, and the optical imaging system should satisfy a condition of $0.02 \le d7/TTL \le 0.05$. Within the conditional range, it is beneficial to control the lens thickness and the total length of the lens. Preferably, it meets $0.02 \le d7/TTL \le 0.04$.

In this embodiment, an object-side surface of the fifth lens L5 is convex in a paraxial region, an image-side surface of the fifth lens L5 is convex in a paraxial region, and the fifth lens L5 has a positive refractive power. In other optional implementation methods, the object-side surface and image-side surface of the fifth lens L5 can also be set to other concave and convex distributions.

A focal length of the optical imaging system 10 is defined as f, a focal length of the fifth lens L5 is defined as f5, and the optical imaging system should satisfy a condition of $0.28 \le f5/f \le 3.02$. The limitation of the fifth lens L5 can effectively make the light angle of the optical imaging system 10 gentle and reduce the tolerance sensitivity. Preferably, it meets $0.46 \le f5/f \le 2.42$.

A curvature radius of an object-side surface of the fifth lens L5 is defined as R9, a curvature radius of a bonding surface of the fifth lens L5 and the sixth lens L6 is defined as R10, and the optical imaging system should satisfy a condition of $-2.07 \le (R9+R10)/(R9-R10) \le -0.30$, which specifies a shape of the lens L5. When within this range, as the lens develops towards miniaturization, it is beneficial to correct the image aberrations at off-axis angles. Preferably, it meets $-1.30 \le (R9+R10)/(R9-R10) \le -0.38$.

An on-axis thickness of the fifth lens L5 is defined as d9, a total optical length of the optical imaging system 10 is defined as TTL, and the optical imaging system should satisfy a condition of $0.01 \le d9/TTL \le 0.03$. Within the conditional range, it is beneficial to control the lens thickness and the total length of the lens. Preferably, it meets d9/TTL=0.02.

An object-side surface of the sixth lens L6 is concave in a paraxial region, an image-side surface of the sixth lens L6 is concave in a paraxial region, and the sixth lens L6 has a negative refractive power. In other optional implementation methods, the object-side surface and image-side surface of the sixth lens L6 can also be set to other concave and convex distributions.

A focal length of the optical imaging system 10 is defined as f, a focal length of the sixth lens L6 is defined as f6, and the optical imaging system should satisfy a condition of $-3.57 \le f6/f \le -0.62$. By reasonably distributing the focal lengths, the system is enabled to have better imaging quality and lower sensitivity. Preferably, it meets $-2.234 \le f6/f \le -0.78$.

A curvature radius of a bonding surface of the fifth lens L5 and the sixth lens L6 is defined as R10, a curvature radius of an image-side surface of the sixth lens L6 is defined as R11, and the optical imaging system should satisfy a condition of $-1.50 \le (R10+R11)/(R10-R11) \le 1.76$, which specifies a shape of the sixth lens L6. When within this range, as the lens develops towards miniaturization, it is beneficial to correct the image aberrations at off-axis angles. Preferably, it meets $-0.94 \le (R10+R11)/(R10-R11) \le 1.40$.

An on-axis thickness of the sixth lens L6 is defined as d11, a total optical length of the optical imaging system 10 is defined as TTL, and the optical imaging system should satisfy a condition of $0.00 \le d11/TTL \le 0.01$. Within the conditional range, it is beneficial to control the lens thickness and the total length of the lens. Preferably, it meets d11/TTL=0.01.

In this embodiment, an object-side surface of the seventh lens L7 is convex in a paraxial region, an image-side surface of the seventh lens L7 is concave in a paraxial region, and the seventh lens L7 has a positive refractive power. In other optional implementation methods, the object-side surface and image-side surface of the seventh lens L7 can also be set to other concave and convex distributions.

A focal length of the optical imaging system 10 is defined as f, a focal length of the seventh lens L7 is defined as f7, and the optical imaging system should satisfy a condition of $0.08 \le f7/f \le 0.92$. By reasonably distributing the focal lengths, the system is enabled to have better imaging quality and lower sensitivity. Preferably, it meets $0.12 \le f7/f \le 0.74$.

A curvature radius of an object-side surface of the seventh lens L7 is defined as R12, a curvature radius of a bonding surface of the seventh lens L7 and the eighth lens L8 is defined as R13, and the optical imaging system should satisfy a condition of $-2.51 \le (R12+R13)/(R12-R13) \le 1.09$, which specifies a shape of the seventh lens L7. When within this range, as the lens develops towards miniaturization, it is beneficial to correct the image aberrations at off-axis angles. Preferably, it meets $-1.57 \le (R12+R13)/(R12-R13) \le 0.87$.

An on-axis thickness of the seventh lens L7 is defined as d13, a total optical length of the optical imaging system 10 is defined as TTL, and the optical imaging system should satisfy a condition of $0.01 \le d13/TTL \le 0.02$. Within the conditional range, it is beneficial to control the lens thickness and the total length of the lens. Preferably, it meets d13/TTL=0.01.

In this embodiment, an object-side surface of the eighth lens L8 is convex in a paraxial region, an image-side surface of the eighth lens L8 is concave in a paraxial region, and the eighth lens L8 has a negative refractive power. In other optional implementation methods, the object-side surface and image-side surface of the eighth lens L8 can also be set to other concave and convex distributions.

A focal length of the optical imaging system 10 is defined as f, a focal length of the eighth lens L8 is defined as f8, and the optical imaging system should satisfy a condition of $-1.47 \leq f8/f \leq -0.09$. By reasonably distributing the focal lengths, the system is enabled to have better imaging quality and lower sensitivity. Preferably, it meets $-0.92 \leq f8/f \leq -0.11$.

A curvature radius of a bonding surface of the seventh lens L7 and the eighth lens L8 is defined as R13, a curvature radius of the image-side surface of the eighth lens L8 is defined as R14, and the optical imaging system should satisfy a condition of $-3.10 \leq (R13+R14)/(R13-R14) \leq 1.70$, which specifies a shape of the eighth lens L8. When within this range, as the lens develops towards miniaturization, it is beneficial to correct the image aberrations at off-axis angles. Preferably, it meets $-1.94 \leq (R13+R14)/(R13-R14) \leq 1.36$.

An on-axis thickness of the eighth lens L8 is defined as d15, a total optical length of the optical imaging system 10 is defined as TTL, and the optical imaging system should satisfy a condition of $0.00 \leq d15/TTL \leq 0.01$. Within the conditional range, it is beneficial to control the lens thickness and the total length of the lens. Preferably, it meets d15/TTL=0.01.

In this embodiment, an object-side surface of the ninth lens L9 is concave in a paraxial region, an image-side surface of the ninth lens L9 is convex in a paraxial region, and the ninth lens L9 has a negative refractive power. In other optional implementation methods, the object-side surface and image-side surface of the ninth lens L9 can also be set to other concave and convex distributions.

A focal length of the optical imaging system 10 is defined as f, a focal length of the ninth lens L9 is defined as f9, and the optical imaging system should satisfy a condition of $-8.64 \leq f9/f \leq -0.36$. By reasonably distributing the focal lengths, the system is enabled to have better imaging quality and lower sensitivity. Preferably, it meets $-5.40 \leq f9/f \leq -0.44$.

A curvature radius of the object-side surface of the ninth lens L9 is defined as R15, a curvature radius of the image-side surface of the ninth lens L9 is defined as R16, and the optical imaging system should satisfy a condition of $-3.07 \leq (R15+R16)/(R15-R16) \leq 6.41$, which specifies a shape of the ninth lens L9. When within this range, as the lens develops towards miniaturization, it is beneficial to correct the image aberrations at off-axis angles. Preferably, it meets $-1.92 \leq (R15+R16)/(R15-R16) \leq 5.12$.

An on-axis thickness of the ninth lens L9 is defined as d17, a total optical length of the optical imaging system 10 is defined as TTL, and the optical imaging system should satisfy a condition of $0.00 \leq d17/TTL \leq 0.01$. Within the conditional range, it is beneficial to control the lens thickness and the total length of the lens.

In this embodiment, an object-side surface of the tenth lens L10 is concave in a paraxial region, an image-side surface of the tenth lens L10 is convex in a paraxial region, and the tenth lens L10 has a positive refractive power. In other optional implementation methods, the object-side surface and image-side surface of the tenth lens L10 can also be set to other concave and convex distributions.

A focal length of the optical imaging system 10 is defined as f, a focal length of the tenth lens L10 is defined as f10, and the optical imaging system should satisfy a condition of $0.24 \leq f10/f \leq 1.33$. By reasonably distributing the focal lengths, the system is enabled to have better imaging quality and lower sensitivity. Preferably, it meets $0.39 \leq f10/f \leq 1.06$.

A curvature radius of the object-side surface of the tenth lens L10 is defined as R17, a curvature radius of the image-side surface of the tenth lens L10 is defined as R18, and the optical imaging system should satisfy a condition of $-0.75 \leq (R17+R18)/(R17-R18) \leq 4.17$, which specifies a shape of the tenth lens L10. When within this range, as the lens develops towards miniaturization, it is beneficial to correct image aberrations at off-axis angles. Preferably, it meets $-0.47 \leq (R17+R18)/(R17-R18) \leq 3.34$.

An on-axis thickness of the tenth lens L10 is defined as d19, a total optical length of the optical imaging system 10 is defined as TTL, and the optical imaging system should satisfy a condition of $0.01 \leq d19/TTL \leq 0.04$. Within the conditional range, it is beneficial to control the lens thickness and the total length of the lens. Preferably, it meets $0.02 \leq d19/TTL \leq 0.03$.

In this embodiment, an object-side surface of the eleventh lens L11 is concave in a paraxial region, an image-side surface of the eleventh lens L11 is convex in a paraxial region, and the eleventh lens L11 has a negative refractive power. In other optional implementation methods, the object-side surface and image-side surface of the eleventh lens L11 can also be set to other concave and convex distributions.

A focal length of the optical imaging system 10 is defined as f, a focal length of the eleventh lens L11 is defined as f11, and the optical imaging system should satisfy a condition of $-3.56 \leq f11/f \leq -0.59$. By reasonably distributing the focal lengths, the system is enabled to have better imaging quality and lower sensitivity. Preferably, it meets $-2.234 \leq f11/f \leq -0.74$.

A curvature radius of the object-side surface of the eleventh lens L11 is defined as R19, a curvature radius of the image-side surface of the eleventh lens L11 is defined as R20, and the optical imaging system should satisfy a condition of $-9.90 \leq (R19+R20)/(R19-R20) \leq -0.20$, which specifies a shape of the eleventh lens L11. When within this range, as the lens develops towards miniaturization, it is beneficial to correct the image aberrations at off-axis angles. Preferably, it meets $-6.19 \leq (R19+R20)/(R19-R20) \leq -0.24$.

An on-axis thickness of the eleventh lens L11 is defined as d21, a total optical length of the optical imaging system 10 is defined as TTL, and the optical imaging system should satisfy a condition of $0.00 \leq d21/TTL \leq 0.01$. Within the conditional range, it is beneficial to control the lens thickness and the total length of the lens. Preferably, it meets d21/TTL=0.01.

In this embodiment, an object-side surface of the twelfth lens L12 is convex in a paraxial region, an image-side surface of the twelfth lens L12 is convex in a paraxial region, and the twelfth lens L12 has a positive refractive power. In other optional implementation methods, the object-side surface and image-side surface of the twelfth lens L12 can also be set to other concave and convex distributions, the twelfth lens L12 can have negative refractive power.

A focal length of the optical imaging system 10 is defined as f, a focal length of the twelfth lens L12 is defined as f12, and the optical imaging system should satisfy a condition of $-2.95 \leq f12/f \leq 2.61$. By reasonably distributing the focal lengths, the system is enabled to have better imaging quality and lower sensitivity. Preferably, it meets $-1.85 \leq f12/f \leq 2.09$.

A curvature radius of the object-side surface of the twelfth lens L12 is defined as R21, a curvature radius of the image-side surface of the twelfth lens L12 is defined as R22, and the optical imaging system should satisfy a condition of $-2.34 \le (R21+R22)/(R21-R22) \le 3.24$, which specifies a shape of the twelfth lens L12. When within this range, as the lens develops towards miniaturization, it is beneficial to correct the image aberrations at off-axis angles. Preferably, it meets $-1.46 \le (R21+R22)/(R21-R22) \le 2.59$.

An on-axis thickness of the twelfth lens L12 is defined as d23, a total optical length of the optical imaging system 10 is defined as TTL, and the optical imaging system should satisfy a condition of $0.00 \le d23/TTL \le 0.01$. Within the conditional range, it is beneficial to control the lens thickness and the total length of the lens. Preferably, it meets $d23/TTL=0.01$.

In this embodiment, the first lens L1, the second lens L2, the third lens L3, the fourth lens L4, the fifth lens L5, the sixth lens L6, the seventh lens L7, the eighth lens L8, the ninth lens L9, the tenth lens L10, the eleventh lens L11, and the twelfth lens L12 are all made of glass.

The optical imaging system 10 has good optical performance while meeting the design requirements of variable aperture, long focal length, miniaturization, and low distortion. According to the characteristics of the optical imaging system 10, the optical imaging system 10 is particularly suitable for industrial line-scan lenses that can change the depth of field during measurement with high pixels.

In the following, examples will be used to describe the optical imaging system 10 of the present disclosure. The symbols recorded in each example will be described as follows. The focal length, on-axis distance, curvature radius, on-axis thickness, inflexion point position, and arrest point position are all in units of mm.

TTL: Optical length (the on-axis distance from the object-side surface OB to the image-side surface Si) in mm.

The F-number (FNO): a ratio of the effective focal length of an optical imaging system to the diameter of the entrance pupil.

The design data of the optical imaging system 10 in Embodiment 1 of the present disclosure are shown in Table 1.

OBJ: Object surface
BS: Beam splitter
ST: Aperture
Gn: The nth lens
R: curvature radius of an optical surface, a central curvature radius for a lens;
R1: curvature radius of the object-side surface of the Beam splitter BS;
R2: curvature radius of the image-side surface of the Beam splitter BS;
R3: curvature radius of the object-side surface of the first lens L1;
R4: curvature radius of a bonding surface of the first lens L1 and the second lens L2;
R5: curvature radius of the image-side surface of the second lens L2;
R6: curvature radius of the object-side surface of the third lens L3;
R7: curvature radius of a bonding surface of the third lens L3 and the fourth lens L4;
R8: curvature radius of the image-side surface of the fourth lens L4;
R9: curvature radius of the object-side surface of the fifth lens L5;
R10: curvature radius of a bonding surface of the fifth lens L5 and the sixth lens L6;
R11: curvature radius of the image-side surface of the sixth lens L6;
R12: curvature radius of an object-side surface of the seventh lens L7;
R13: curvature radius of a bonding surface of the seventh lens L7 and the eighth lens L8;
R14: curvature radius of the image-side surface of the eighth lens L8;
R15: curvature radius of the object-side surface of the ninth lens L9;
R16: curvature radius of the image-side surface of the ninth lens L9;

TABLE 1

| Lens | | R | | d | | nd | | vd |
| --- | --- | --- | --- | --- | --- | --- | --- | --- |
| OB | | | dOB= | 102 | | | | |
| BS | R1 | INF | dBS= | 29.1 | ndBS | 1.5163 | VBS | 64.14 |
| | R2 | INF | dBS-1= | 14.52 | | | | |
| G1 | R3 | −43.550 | d1= | 4.220 | nd1 | 1.7783 | v1 | 23.89 |
| G2 | R4 | −112.160 | d3= | 6.890 | nd2 | 2.0010 | v2 | 29.16 |
| | R5 | −60.400 | d2-3= | 0.700 | | | | |
| G3 | R6 | 73.700 | d5= | 1.250 | nd3 | 1.7433 | v3 | 49.22 |
| G4 | R7 | 51.570 | d7= | 19.170 | nd4 | 1.4970 | v4 | 81.61 |
| | R8 | −99.330 | d4-5= | 0.500 | | | | |
| G5 | R9 | 56.000 | d9= | 12.450 | nd5 | 1.4378 | v5 | 94.52 |
| G6 | R10 | −150.270 | d11= | 1.210 | nd6 | 1.7995 | v6 | 42.25 |
| | R11 | 276.500 | d6-7= | 0.600 | | | | |
| G7 | R12 | 66.220 | d13= | 7.300 | nd7 | 1.9229 | v7 | 18.90 |
| G8 | R13 | 588.000 | d15= | 5.210 | nd8 | 1.7618 | v8 | 26.61 |
| | R14 | 36.520 | d8-ST= | 24.910 | | | | |
| ST | | | dST-9= | 7.420 | | | | |
| G9 | R15 | −36.520 | d17= | 3.540 | nd9 | 1.5831 | v9 | 59.46 |
| | R16 | −384.000 | d9-10= | 3.730 | | | | |
| G10 | R17 | −65.860 | d19= | 15.700 | nd10 | 1.4970 | v10 | 81.61 |
| | R18 | −31.030 | d10-11= | 1.000 | | | | |
| G11 | R19 | −31.580 | d21= | 2.000 | nd11 | 1.5750 | v11 | 41.51 |
| | R20 | −47.560 | d11-12= | 0.850 | | | | |
| G12 | R21 | 588.000 | d23= | 5.500 | nd12 | 1.6204 | v12 | 60.34 |
| | R22 | −99.330 | d12-Si= | 359.617 | | | | |

In the table, meanings of various symbols will be described as follows.

R17: curvature radius of the object-side surface of the tenth lens L10;

R18: curvature radius of the image-side surface of the tenth lens L10;

R19: curvature radius of the object-side surface of the eleventh lens L11;

R20: curvature radius of the image-side surface of the eleventh lens L11;

R21: curvature radius of the object-side surface of the twelfth lens L12;

R22: curvature radius of the image-side surface of the twelfth lens L12;

d: on-axis thickness of a lens and an on-axis distance between lens;

dOB: on-axis distance from the object surface OB to the object-side surface of the beam splitter BS;

dBS: on-axis thickness of the beam splitter BS;

dBS-1: on-axis distance from the image-side surface of the beam splitter BS to the object-side surface of the first lens L1;

d1: on-axis thickness of the first lens L1;

d3: on-axis thickness of the second lens L2;

d2-3: on-axis distance from the image-side surface of the second lens L2 to the object-side surface of the third lens L3;

d5: on-axis thickness of the third lens L3;

d7: on-axis thickness of the fourth lens L4;

d4-5: on-axis distance from the image-side surface of the fourth lens L4 to the object-side surface of the fifth lens L5;

d9: on-axis thickness of the fifth lens L5;

d11: on-axis thickness of the sixth lens L6;

d6-7: on-axis distance from the image-side surface of the sixth lens L6 to the object-side surface of the seventh lens L7;

d13: on-axis thickness of the seventh lens L7;

d15: on-axis thickness of the eighth lens L8;

d8-ST: on-axis distance from the image-side surface of the eighth lens L8 to the object-side surface of the aperture;

d17: on-axis thickness of the ninth lens L9;

d9-10: on-axis distance from the image-side surface of the ninth lens L9 to the object-side surface of the tenth lens L10;

d19: on-axis thickness of the tenth lens L10;

d10-11: on-axis distance from the image-side surface of the tenth lens L10 to the object-side surface of the eleventh lens L11;

d21: on-axis thickness of the eleventh lens L11;

d11-12: on-axis distance from the image-side surface of the eleventh lens L11 to the object-side surface of the twelfth lens L12;

d23: on-axis thickness of the twelfth lens L12;

d12-Si: on-axis distance from the image-side surface of the twelfth lens L12 to the image surface Si;

nd: refractive index of the d line;

ndBS: refractive index of the d line of the beam splitter BS;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

nd7: refractive index of the d line of the seventh lens L7;

nd8: refractive index of the d line of the eighth lens L8;

nd9: refractive index of the d line of the ninth lens L9;

nd10: refractive index of the d line of the tenth lens L10;

nd11: refractive index of the d line of the eleventh lens L11;

nd12: refractive index of the d line of the twelfth lens L12;

vd: abbe number;

vBS: abbe number of the beam splitter BS;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

v8: abbe number of the eighth lens L8;

v9: abbe number of the ninth lens L9;

v10: abbe number of the tenth lens L10;

v11: abbe number of the eleventh lens L11;

v12: abbe number of the twelfth lens L12.

Figure 2:
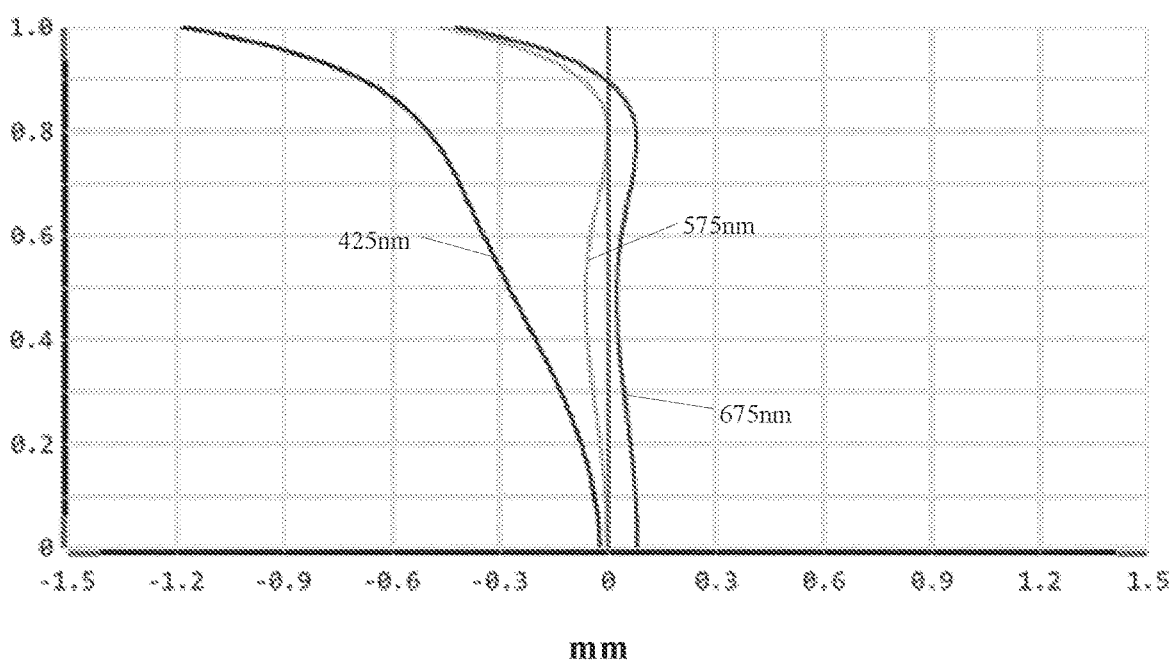
FIG. 2 is a schematic diagram of a longitudinal aberration of the optical imaging system shown in FIG. 1.
Figure 3:
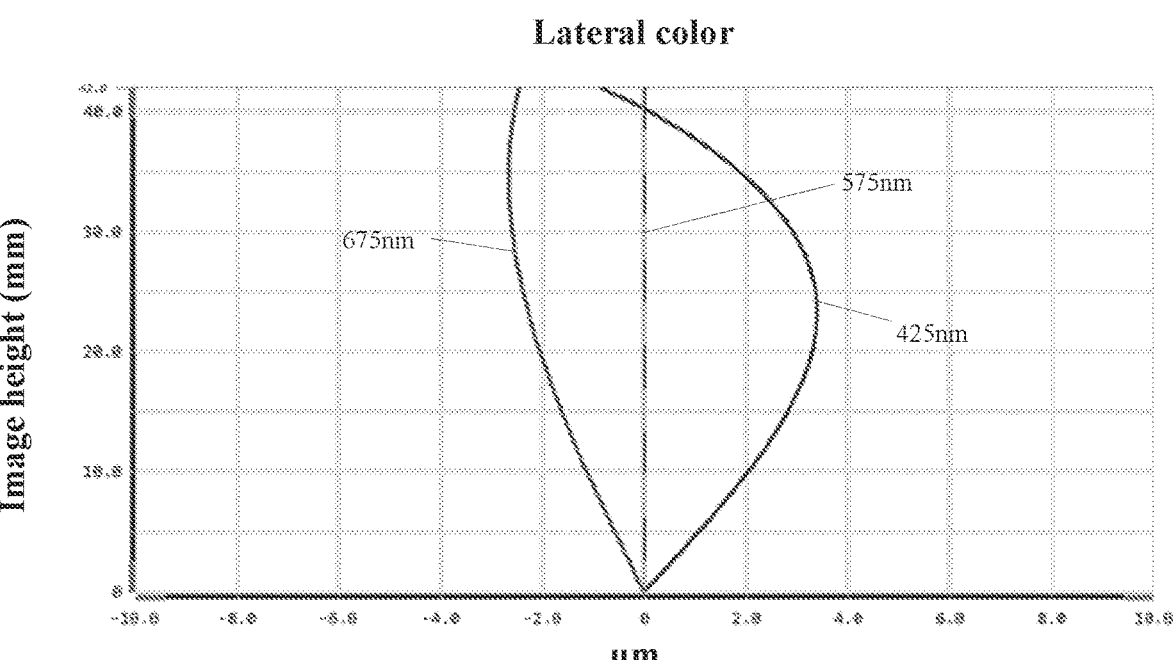
FIG. 3 is a schematic diagram of a lateral color of the optical imaging system shown in FIG. 1.
Figure 4:
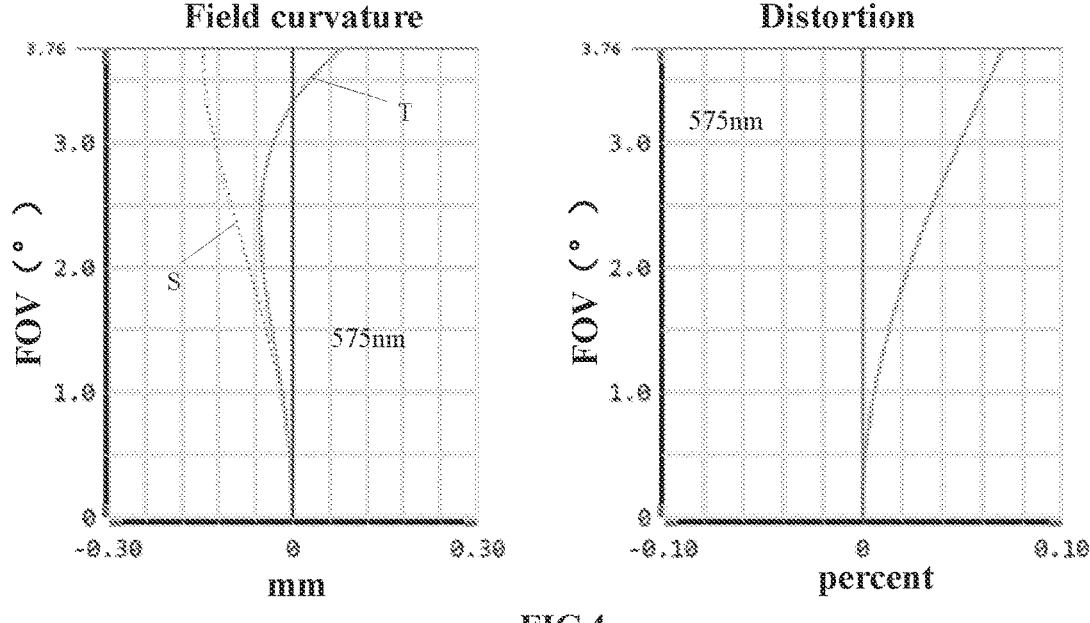
FIG. 4 is a schematic diagram of a field curvature and a distortion of the optical imaging system shown in FIG. 1.

FIG. 2, FIG. 3 illustrate a longitudinal aberration and a lateral color with wavelengths of 425 nm, 575 nm, and 675 nm after passing the optical imaging system 10 according to Embodiment 1, respectively. FIG. 4 illustrates a field curvature and a distortion with a wavelength of 575 nm after passing the optical imaging system 10 according to Embodiment 1. A field curvature S in FIG. 4 is a field curvature in a sagittal direction, and T is a field curvature in a tangential direction.

Table 5 in the following shows various values of Embodiments 1, 2, 3, 4 and values corresponding to parameters which are specified in the above conditions.

As shown in Table 5, Embodiment 1 satisfies the above conditions.

In this Embodiment, an entrance pupil diameter of the optical imaging system 10 is 72.959 mm and 14.503 mm. That is, a variable aperture, used to change the depth of field during measurement. An image height of 1.0H is 42.000 mm, a FOV (field of view) in a diagonal direction is 3.75°. Thus, the optical imaging system 10 is designed to meet the design requirements of variable aperture, long focal length, miniaturization, and low distortion. Its on-axis and off-axis chromatic aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

In this embodiment, the image-side surface of the seventh lens L7 is convex at the paraxial region, the object-side surface of the eighth lens L8 is concave at the paraxial region, and the object-side surface of the tenth lens L10 is convex at the paraxial region.

Figure 5:
FIG. 5 is a schematic diagram of a structure of an optical imaging system 20 according to Embodiment 2 of the present disclosure.
Figure 5:
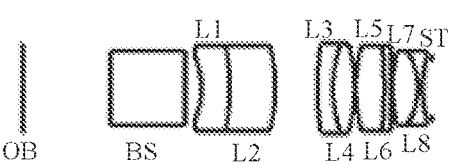
Figure 5:
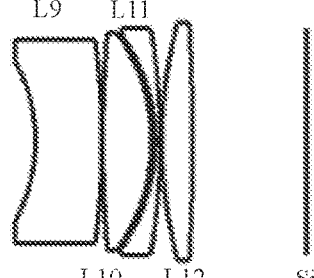

FIG. 5 shows the optical imaging system 20 according to Embodiment 2 of the present disclosure.

The design data of the optical imaging system 20 in Embodiment 2 of the present disclosure are shown in Table 2.

TABLE 2

| Lens | | R | | d | | nd | | vd |
|---|---|---|---|---|---|---|---|---|
| OB | | | dOB= | 33.7347871 | | | | |
| BS | R1 | INF | dBS= | 29.1 | ndBS | 1.5168 | VBS | 64.17 |
| | R2 | INF | dBS-1= | 6.15040057 | | | | |
| G1 | R3 | −26.873 | d1= | 10.958 | nd1 | 1.8467 | v1 | 23.78 |
| G2 | R4 | −71.199 | d3= | 17.551 | nd2 | 2.0010 | v2 | 29.16 |
| | R5 | −56.795 | d2-3= | 16.453 | | | | |
| G3 | R6 | 113.302 | d5= | 6.000 | nd3 | 1.7421 | v3 | 49.25 |
| G4 | R7 | 45.233 | d7= | 8.465 | nd4 | 1.4378 | v4 | 94.52 |
| | R8 | −52.874 | d4-5= | 0.298 | | | | |
| G5 | R9 | 53.921 | d9= | 11.000 | nd5 | 1.4565 | v5 | 90.27 |
| G6 | R10 | −160.762 | d11= | 2.774 | nd6 | 1.7440 | v6 | 44.90 |
| | R11 | 1130.487 | d6-7= | 0.300 | | | | |
| G7 | R12 | 53.705 | d13= | 9.907 | nd7 | 1.7283 | v7 | 28.32 |
| G8 | R13 | −24.648 | d15= | 1.857 | nd8 | 1.7174 | v8 | 29.51 |
| | R14 | 39.917 | d8-ST= | 3.594 | | | | |
| ST | | | dST-9= | 178.705 | | | | |
| G9 | R15 | −59.111 | d17= | 25.660 | nd9 | 1.6081 | v9 | 57.82 |
| | R16 | −279.414 | d9-10= | 0.299 | | | | |
| G10 | R17 | 484.333 | d19= | 18.860 | nd10 | 1.6204 | v10 | 60.37 |
| | R18 | −67.356 | d10-11= | 1.336 | | | | |
| G11 | R19 | −67.409 | d21= | 2.000 | nd11 | 1.6259 | v11 | 35.70 |
| | R20 | −238.113 | d11-12= | 0.655 | | | | |
| G12 | R21 | 166.461 | d23= | 11.786 | nd12 | 1.6680 | v12 | 55.30 |
| | R22 | −810.099 | d12-Si= | 44.240 | | | | |

Figure 6:
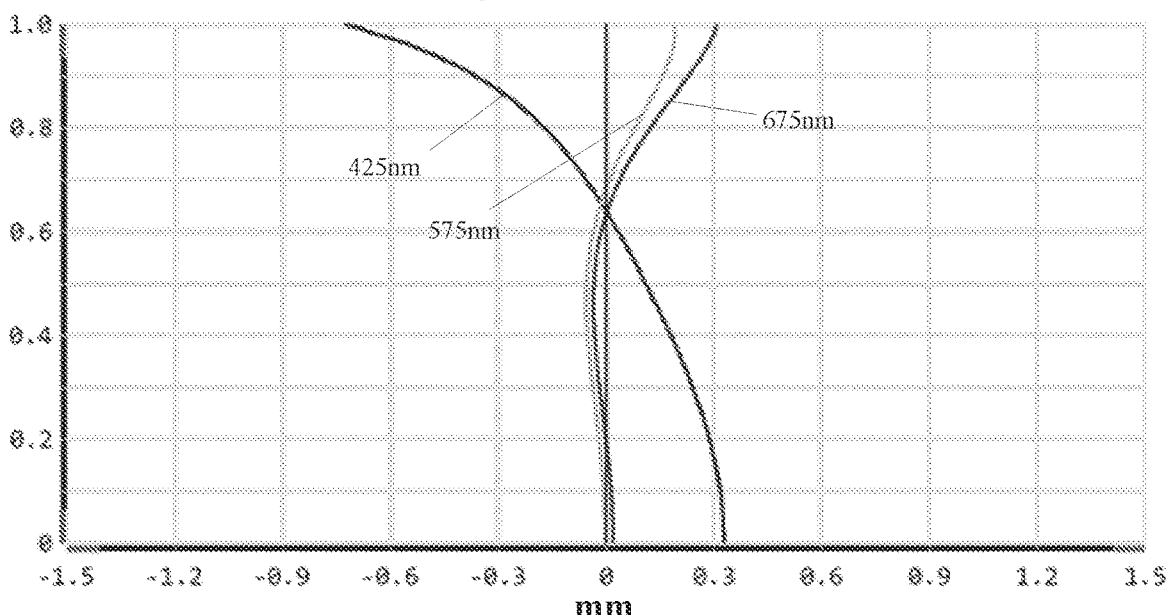
FIG. 6 is a schematic diagram of a longitudinal aberration of the optical imaging system shown in FIG. 5.
Figure 7:
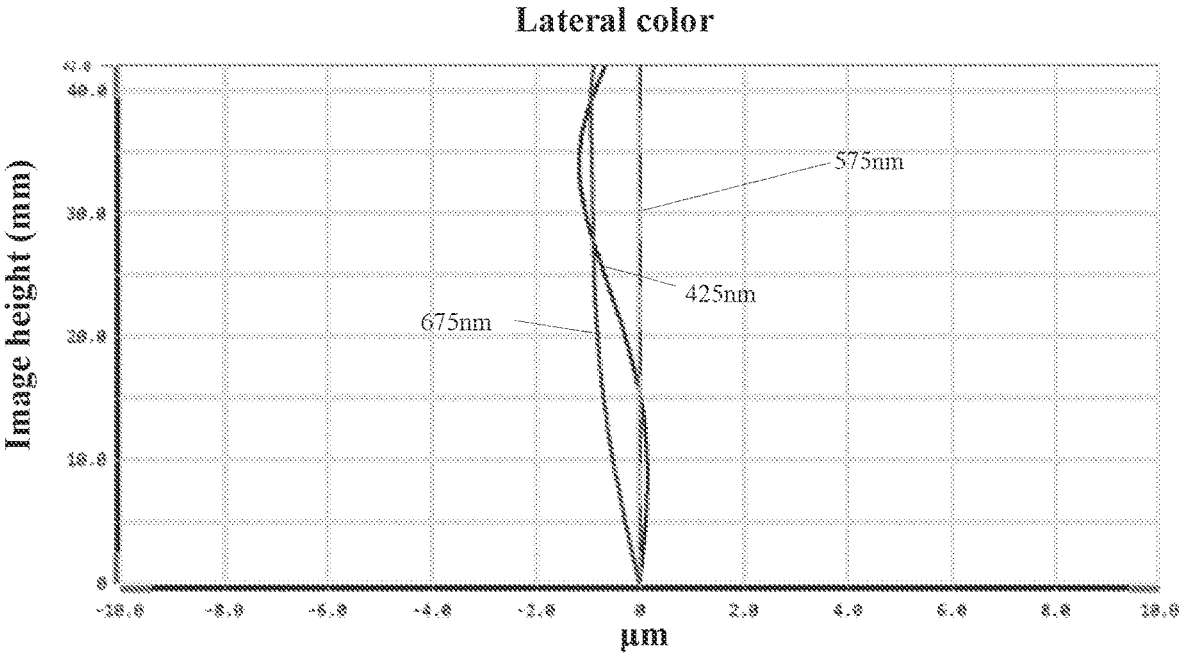
FIG. 7 is a schematic diagram of a lateral color of the optical imaging system shown in FIG. 5.
Figure 8:
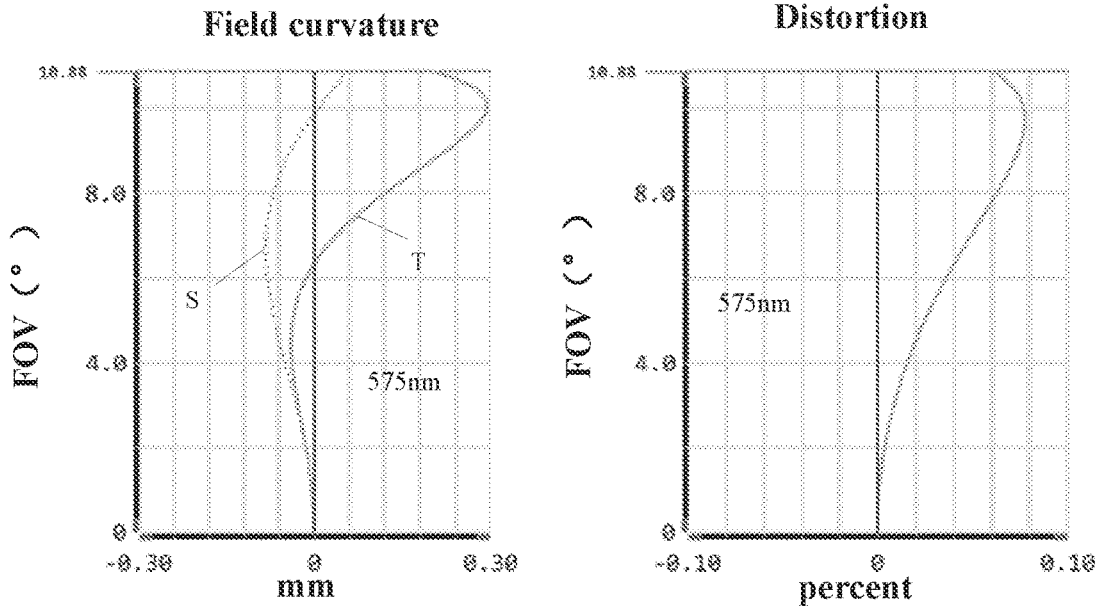
FIG. 8 is a schematic diagram of a field curvature and a distortion of the optical imaging system shown in FIG. 5.

FIG. 6 and FIG. 7 illustrate a longitudinal aberration and a lateral color of light with wavelengths of 425 nm, 575 nm and 675 nm after passing the optical imaging system 20 according to Embodiment 2. FIG. 8 illustrates a field curvature and a distortion of light with a wavelength of 575 nm after passing the optical imaging system 20 according to Embodiment 2. A field curvature S in FIG. 8 is a field curvature in a sagittal direction, and T is a field curvature in a tangential direction.

As shown in Table 5, Embodiment 2 satisfies the above conditions.

In this embodiment, an entrance pupil diameter of the optical imaging system 20 is 18.018 mm and 5.381 mm. That is, a variable aperture, used to change the depth of field during measurement. An image height of 1.01-1 is 42.000 mm, a FOV (field of view) in the diagonal direction is 21.750. Thus, the optical imaging system 20 is designed to meet the design requirements of variable aperture, long focal length, and miniaturization. Its on-axis and off-axis chromatic aberrations are fully corrected, thereby achieving excellent optical characteristics.

Embodiment 3

Embodiment 3 is basically the same as Embodiment 1 and involves symbols having the same meanings as Embodiment 1, and only differences therebetween will be described in the following.

In this embodiment, the object-side surface of the third lens L3 is concave at the paraxial region, the image-side surface of the fifth lens L5 is concave at the paraxial region, the object-side surface of the sixth lens L6 is convex at the paraxial region, the image-side surface of the seventh lens L7 is convex at the paraxial region, the object-side surface of the eighth lens L8 is concave at the paraxial region, the image-side surface of the ninth lens L9 is concave at the paraxial region, the object-side surface of the tenth lens L10 is convex at the paraxial region, and the object-side surface of the twelfth lens L12 is concave at the paraxial region; the first lens L1 has a positive refractive power, and the second lens L2 has a negative refractive power.

Figure 9:
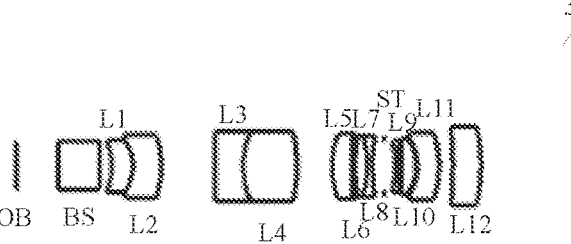
FIG. 9 is a schematic diagram of a structure of a optical imaging system 30 according to Embodiment 3 of the present disclosure.

FIG. 9 shows the optical imaging system 30 according to Embodiment 3 of the present disclosure.

Table 3 shows design data of an optical imaging system 30 in Embodiment 3 of the present disclosure.

TABLE 3

| Lens | | R | | d | | nd | | vd |
|---|---|---|---|---|---|---|---|---|
| OB | | | dOB= | 29.9995512 | | | | |
| BS | R1 | INF | dBS= | 29.1 | ndBS | 1.5168 | VBS | 64.17 |
| | R2 | INF | dBS-1= | 8.2325172 | | | | |
| G1 | R3 | −46.458 | d1= | 15.001 | nd1 | 1.8503 | v1 | 32.30 |
| G2 | R4 | −28.359 | d3= | 20.001 | nd2 | 1.8501 | v2 | 30.01 |
| | R5 | −64.697 | d2-3= | 38.000 | | | | |
| G3 | R6 | −852.782 | d5= | 20.001 | nd3 | 1.7550 | v3 | 52.32 |
| G4 | R7 | 56.601 | d7= | 38.001 | nd4 | 1.5928 | v4 | 68.34 |
| | R8 | −116.594 | d4-5= | 25.000 | | | | |
| G5 | R9 | 56.801 | d9= | 14.063 | nd5 | 1.4378 | v5 | 94.52 |
| G6 | R10 | 3117.224 | d11= | 2.000 | nd6 | 2.1042 | v6 | 17.02 |
| | R11 | 245.154 | d6-7= | 0.300 | | | | |
| G7 | R12 | 115.082 | d13= | 8.428 | nd7 | 1.8081 | v7 | 22.70 |
| G8 | R13 | −67.243 | d15= | 3.805 | nd8 | 1.7408 | v8 | 27.76 |
| | R14 | 123.833 | d8-ST= | 7.948 | | | | |
| ST | | | dST-9= | 7.944 | | | | |
| G9 | R15 | −80.708 | d17= | 1.798 | nd9 | 1.6245 | v9 | 58.21 |
| | R16 | 102.193 | d9-10= | 2.980 | | | | |

TABLE 3-continued

| Lens | | R | d | | nd | | vd |
|---|---|---|---|---|---|---|---|
| G10 | R17 | 9462.265 | d19= | 9.742 | nd10 | 1.4970 v10 | 81.61 |
| | R18 | −32.877 | d10-11= | 1.342 | | | |
| G11 | R19 | −32.143 | d21= | 15.000 | nd11 | 1.5407 v11 | 47.20 |
| | R20 | −74.480 | d11-12= | 9.824 | | | |
| G12 | R21 | −293.766 | d23= | 19.846 | nd12 | 1.6968 v12 | 56.18 |
| | R22 | −107.897 | d12-Si= | 478.436 | | | |

Figure 10:
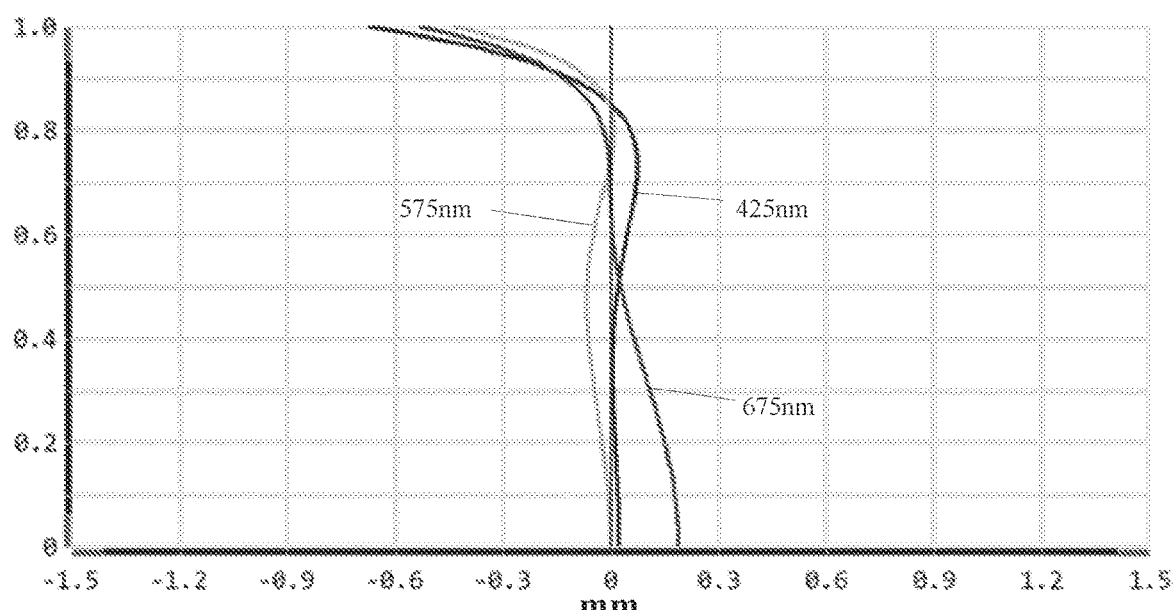
FIG. 10 is a schematic diagram of a longitudinal aberration of the optical imaging system shown in FIG. 9.
Figure 11:
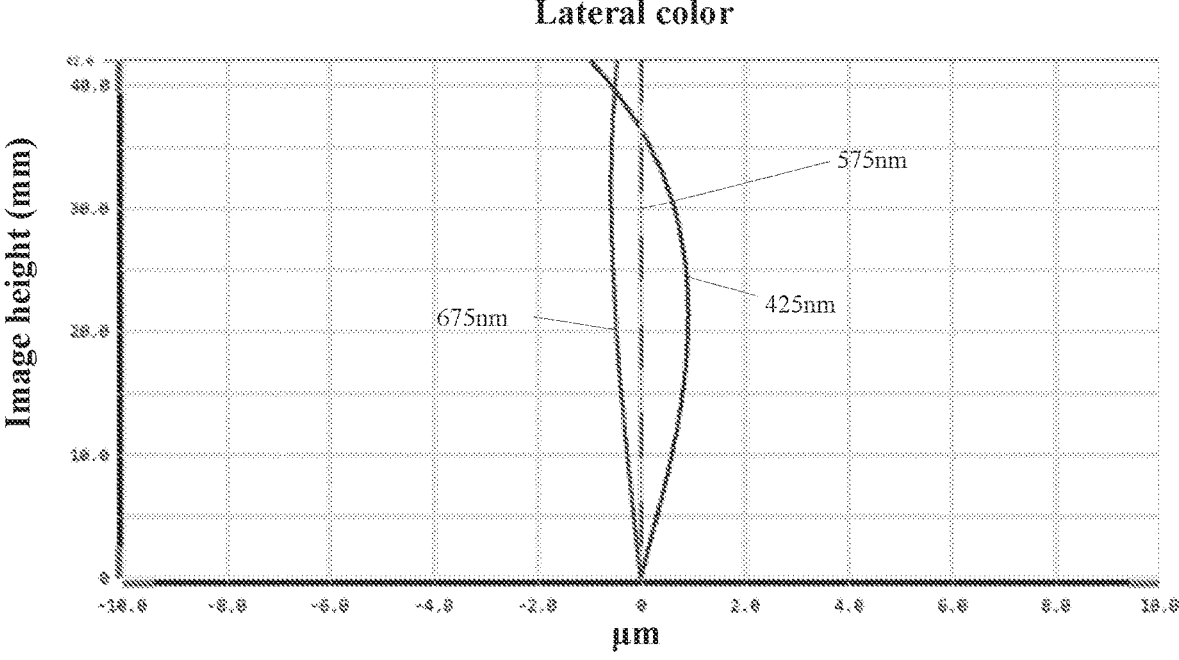
FIG. 11 is a schematic diagram of a lateral color of the optical imaging system shown in FIG. 9.
Figure 12:
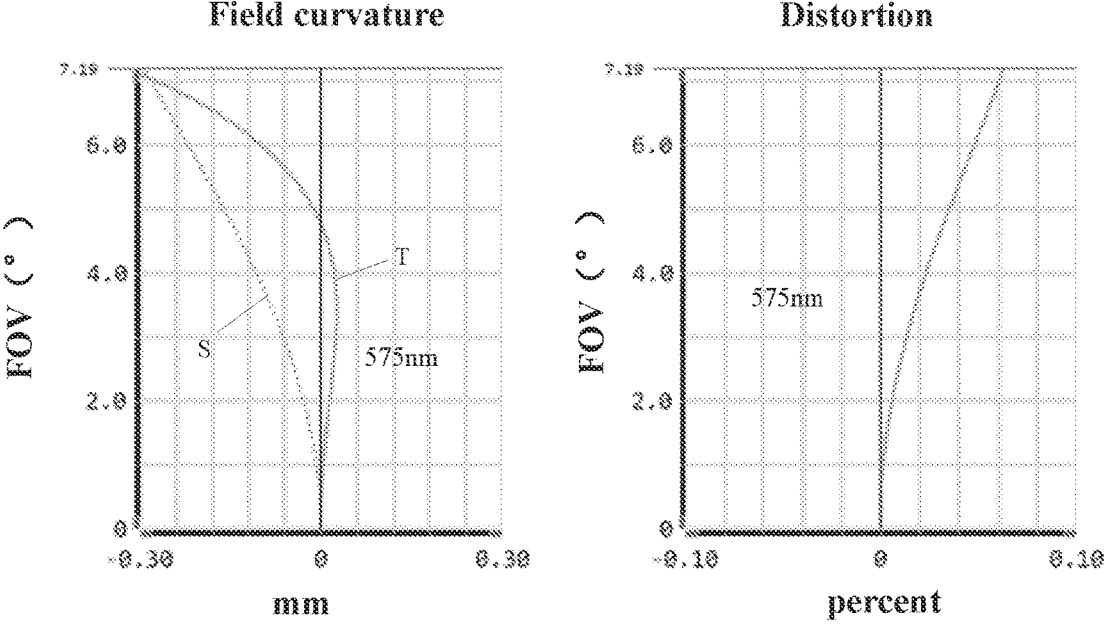
FIG. 12 is a schematic diagram of a field curvature and a distortion of the optical imaging system 40 shown in FIG. 9.

FIG. 10 and FIG. 11 illustrate a longitudinal aberration and a lateral color of light with wavelengths of 425 nm, 575 nm and 675 nm after passing the optical imaging system 30 according to Embodiment 3. FIG. 12 illustrates a field curvature and a distortion of light with a wavelength of 575 nm after passing the optical imaging system 30 according to Embodiment 3. A field curvature S in FIG. 12 is a field curvature in a sagittal direction, and T is a field curvature in a tangential direction.

Embodiment 4

Embodiment 4 is basically the same as Embodiment 1 and involves symbols having the same meanings as Embodiment 1, and only differences therebetween will be described in the following.

In this embodiment, the image-side surface of the first lens L1 is concave at the paraxial region, the object-side surface of the second lens L2 is convex at the paraxial region, the image-side surface of the seventh lens L7 is convex at the paraxial region, the object-side surface of the eighth lens L8 is concave at the paraxial region, the image-side surface of the eighth lens L8 is convex at the paraxial region, the object-side surface of the ninth lens L9 is convex at the paraxial region, the image-side surface of the ninth lens L9 is concave at the paraxial region, the object-side surface of the tenth lens L10 is convex at the paraxial region, the image-side surface of the eleventh lens L11 is concave at the paraxial region, and the object-side surface of the twelfth lens L12 is concave at the paraxial region.

Figure 13:
FIG. 13 is a schematic diagram of a structure of an optical imaging system according to Embodiment 4 of the present disclosure.
Figure 13:
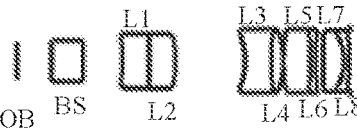
Figure 13:
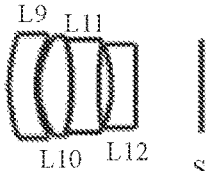

FIG. 13 shows the optical imaging system 40 according to Embodiment 4 of the present disclosure.

Table 4 shows design data of an optical imaging system 40 in Embodiment 4 of the present disclosure.

TABLE 4

| Lens | | R | d | | nd | | vd |
|---|---|---|---|---|---|---|---|
| OB | | | dOB= | 33.0787141 | | | |
| BS | R1 | INF | dBS= | 29.1 | ndBS | 1.5168 VBS | 64.17 |
| | R2 | INF | dBS-1= | 37.3058321 | | | |
| G1 | R3 | −111.631 | d1= | 25.001 | nd1 | 1.8023 v1 | 45.45 |
| G2 | R4 | 459.725 | d3= | 25.001 | nd2 | 1.6989 v2 | 30.05 |
| | R5 | −94.833 | d2-3= | 65.000 | | | |
| G3 | R6 | −69.159 | d5= | 25.001 | nd3 | 1.6477 v3 | 33.84 |
| G4 | R7 | 165.853 | d7= | 11.475 | nd4 | 1.5691 v4 | 71.30 |
| | R8 | −82.261 | d4-5= | 0.528 | | | |
| G5 | R9 | 159.754 | d9= | 25.000 | nd5 | 1.5922 v5 | 68.28 |
| G6 | R10 | −521.583 | d11= | 5.000 | nd6 | 1.9229 v6 | 18.90 |
| | R11 | 186.485 | d6-7= | 6.875 | | | |
| G7 | R12 | 300.597 | d13= | 19.981 | nd7 | 1.8081 v7 | 22.70 |
| G8 | R13 | −47.639 | d15= | 5.000 | nd8 | 1.8063 v8 | 25.38 |
| | R14 | −220.863 | d8-ST= | 1.103 | | | |
| ST | | | dST-9= | 583.571 | | | |
| G9 | R15 | 139.659 | d17= | 25.000 | nd9 | 1.6209 v9 | 63.83 |
| | R16 | 86.661 | d9-10= | 2.810 | | | |
| G10 | R17 | 75.664 | d19= | 30.000 | nd10 | 1.5922 v10 | 68.28 |
| | R18 | −165.732 | d10-11= | 1.357 | | | |
| G11 | R19 | −177.625 | d21= | 25.000 | nd11 | 1.6089 v11 | 57.90 |
| | R20 | 324.551 | d11-12= | 11.553 | | | |
| G12 | R21 | −97.739 | d23= | 23.221 | nd12 | 1.6968 v12 | 56.18 |
| | R22 | −1241.800 | d12-Si= | 62.348 | | | |

40

Figure 14:
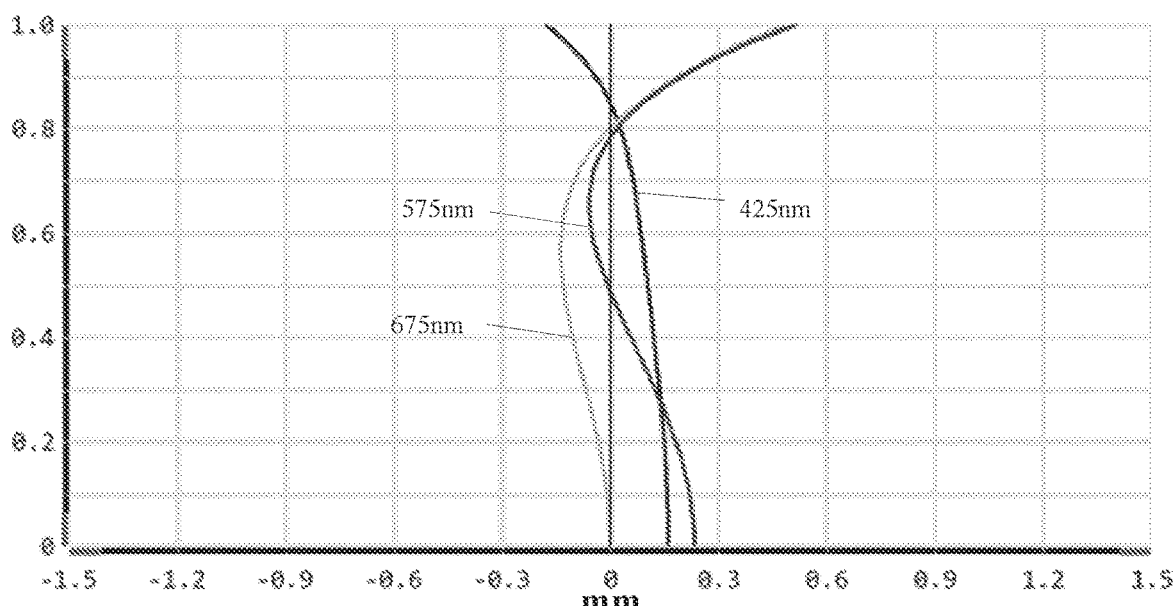
FIG. 14 is a schematic diagram of a longitudinal aberration of the optical imaging system shown in FIG. 13.
Figure 15:
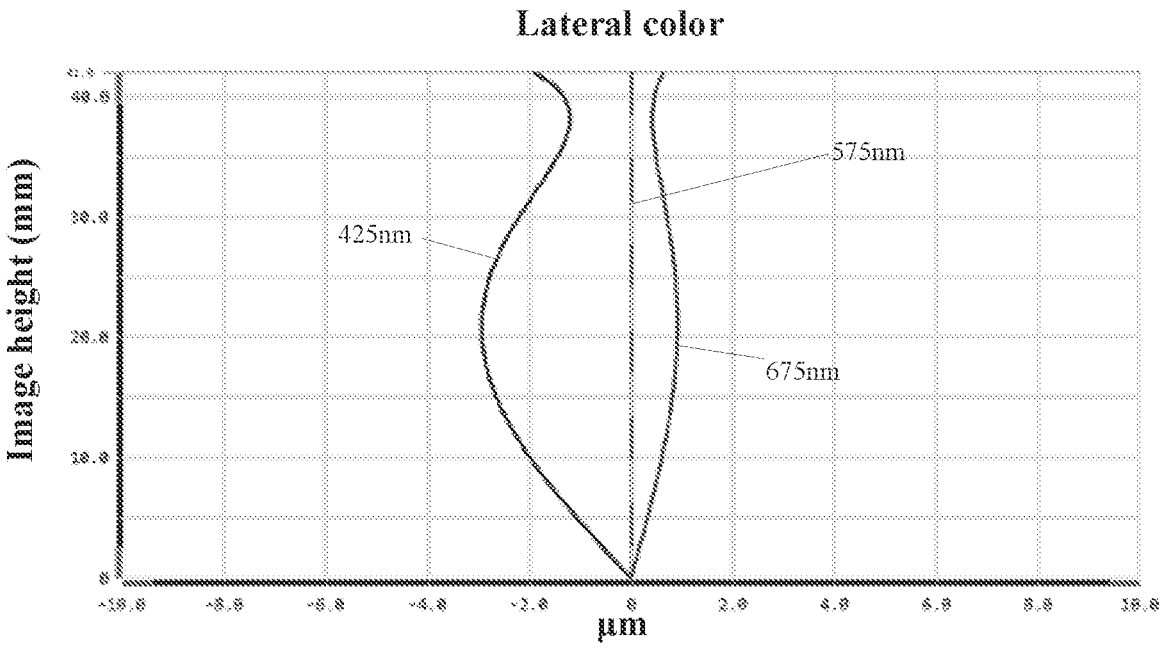
FIG. 15 is a schematic diagram of a lateral color of the optical imaging system shown in FIG. 13.
Figure 16:
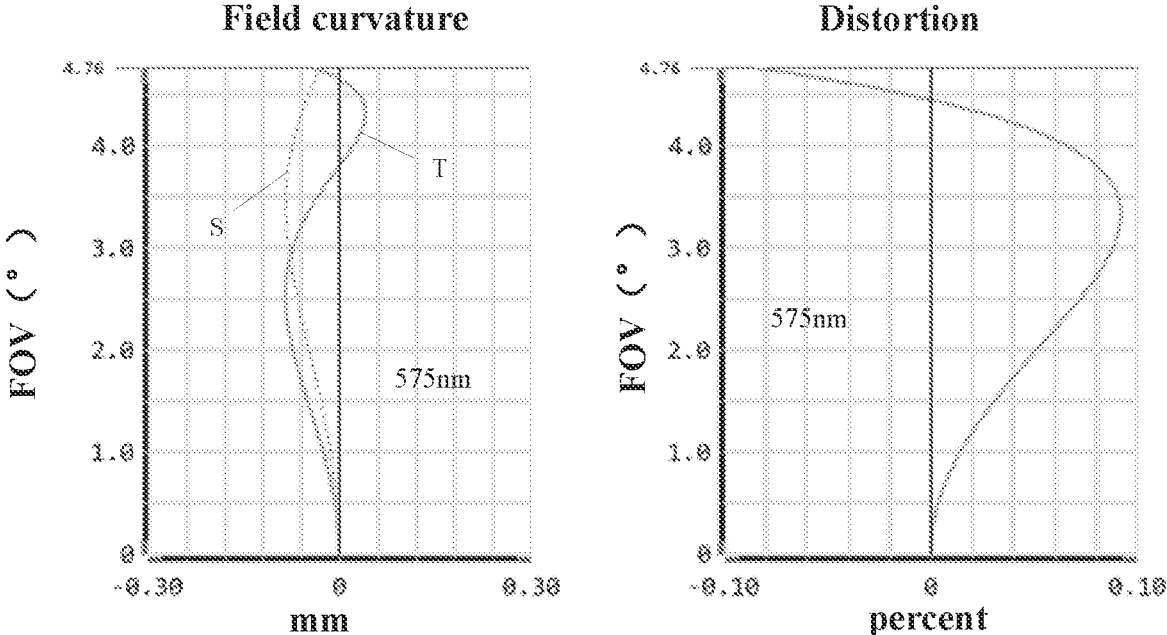
FIG. 16 is a schematic diagram of a field curvature and a distortion of the optical imaging system shown in FIG. 13.

FIG. 14 and FIG. 15 illustrate a longitudinal aberration and a lateral color of light with wavelengths of 425 nm, 575 nm and 675 nm after passing the optical imaging system 40 according to Embodiment 4. FIG. 16 illustrates a field curvature and a distortion of light with a wavelength of 575 nm after passing the optical imaging system 40 according to Embodiment 4. A field curvature S in FIG. 16 is a field curvature in a sagittal direction, and T is a field curvature in a tangential direction.

Table 5 in the following shows various values of this embodiment corresponding to parameters which are specified in the above conditions. Obviously, the optical imaging system 40 of this embodiment satisfies the above conditions.

In this embodiment, an entrance pupil diameter of the optical imaging system is 44.802 mm and 12.105 mm. That is, a variable aperture, used to change the depth of field during measurement. An image height of 1.0H is 42.000 mm, a FOV (field of view) in the diagonal direction is 9.52°. Thus, the optical imaging system 40 is designed to meet the design requirements of variable aperture, long focal length, and miniaturization. Its on-axis and off-axis chromatic aberrations are fully corrected, thereby achieving excellent optical characteristics.

TABLE 5

| Parameters and conditions | Embodiment 1 | Embodiment 2 | Embodiment 3 | Embodiment 4 |
|---|---|---|---|---|
| f9/d17 | −19.60 | −5.02 | −39.96 | −17.94 |
| d23/d22 | 6.47 | 17.99 | 2.02 | 2.01 |
| f12′/f34 | −6.51 | −1.02 | −2.99 | −1.02 |
| IH*f/TTL | 8.68 | 14.99 | 7.00 | 4.04 |
| f | 129.997 | 157.643 | 134.480 | 103.825 |
| f1 | −93.752 | −57.355 | 61.853 | −109.660 |
| f2 | 122.304 | 173.783 | −79.356 | 114.358 |
| f3 | −236.443 | −105.275 | −69.554 | −72.187 |
| f4 | 71.252 | 57.145 | 69.928 | 98.185 |
| f5 | 94.864 | 89.829 | 131.870 | 209.180 |
| f6 | −121.427 | −188.724 | −240.154 | −147.845 |
| f7 | 80.049 | 24.449 | 53.479 | 52.080 |
| f8 | −51.197 | −20.943 | −58.197 | −76.124 |
| f9 | −69.392 | −128.826 | −71.858 | −448.527 |
| f10 | 102.598 | 96.469 | 65.890 | 91.890 |
| f11 | −171.019 | −150.638 | −119.273 | −184.842 |
| f12 | 137.235 | 207.471 | 234.168 | −153.349 |
| FNO | 1.78 | 8.75 | 4.47 | 2.32 |
|  | 8.96 | 29.30 | 16.48 | 8.55 |
| TTL | 483.767 | 372.700 | 739.462 | 979.825 |
| IH | 42.000 | 42.000 | 42.000 | 42.000 |
| FOV | 3.75° | 21.75° | 14.38° | 9.52° |

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. An optical imaging system comprising, from an object side to an image side:

a first lens;

a second lens;

a third lens having a negative refractive power;

a fourth lens having a positive refractive power;

a fifth lens having a positive refractive power;

a sixth lens having a negative refractive power;

a seventh lens having a positive refractive power;

an eighth lens having a negative refractive power;

a ninth lens having a negative refractive power;

a tenth lens having a positive refractive power;

an eleventh lens; and a twelfth lens having a positive refractive power;

wherein the optical imaging system satisfies following conditions:

$$-40.00 \le f9/d17 \le -5.00;$$

$$2.00 \le d23/d22 \le 18.00;$$

$$-6.51 \le f12'/f34 \le -1.00; \text{ and}$$

$$4.00 \le IH * f/TTL \le 15.00;$$

where f denotes a focal length of the optical imaging system;

f9 denotes a focal length of the ninth lens;

d17 denotes an on-axis thickness of the ninth lens;

d23 denotes an on-axis thickness of the twelfth lens;

d22 denotes an on-axis distance from the image-side surface of the eleventh lens to the object-side surface of the twelfth lens;

f12′ denotes a combined focal length of the first lens and the second lens;

f34 denotes a combined focal length of the third lens and the fourth lens;

IH denotes an image height of the optical imaging system; and

TTL denotes a total optical length of the optical imaging system.

2. The optical imaging system according to claim 1, further satisfying following conditions:

$$45.00 \le v5 - v6 \le 80.00;$$

where v5 denotes an abbe number of the fifth lens; and v6 denotes an abbe number of the sixth lens.

3. The optical imaging system according to claim 1, further satisfying following conditions:

$$-6.00 \le R11/f6 \le -1.00;$$

where

R11 denotes a curvature radius of the image-side surface of the sixth lens; and f6 denotes a focal length of the sixth lens.

4. The optical imaging system according to claim 1, wherein an object-side surface of the first lens is concave in a paraxial region; and the optical imaging system further satisfies following conditions:

$$-2.11 \le f1/f \le 0.69;$$

$$-4.54 \le (R3 + R4)/(R3 - R4) \le 6.20;$$

$$0.00 \le d1/TTL \le 0.01;$$

where f1 denotes a focal length of the first lens;

R3 denotes a curvature radius of the object-side surface of the first lens;

R4 denotes a curvature radius of a bonding surface of the first lens and the second lens; and d1 denotes an on-axis thickness of the first lens.

5. The optical imaging system according to claim 1, wherein an image-side surface of the second lens is convex in a paraxial region; and the optical imaging system further satisfies following conditions:

$$-1.18 \le f2/f \le 1.65;$$

$$-5.12 \le (R4 + R5)/(R4 - R5) \le 13.33;$$

$$0.01 \le d3/TTL \le 0.02;$$

where f2 denotes a focal length of the second lens;

R4 denotes a curvature radius of a bonding surface of the first lens and the second lens;

R5 denotes a curvature radius of the image-side surface of the second lens; and d3 denotes an on-axis thickness of the second lens.

6. The optical imaging system according to claim 1, wherein an object-side surface of the third lens is convex in a paraxial region; and the optical imaging system further satisfies following conditions:

$$-3.64 \le f3/f \le -0.34;$$
$$-0.82 \le (R6 + R7)/(R6 - R7) \le 8.49;$$
$$0.00 \le d5/TTL \le 0.01;$$

where f3 denotes a focal length of the third lens;

R6 denotes a curvature radius of the object-side surface of the third lens;

R7 denotes a curvature radius of a bonding surface of the third lens and the fourth lens; and d5 denotes an on-axis thickness of the third lens.

7. The optical imaging system according to claim 1, wherein an object-side surface of the fourth lens is convex in a paraxial region, an image-side surface of the fourth lens is convex in a paraxial region; and the optical imaging system further satisfies following conditions:

$$0.18 \le f4/f \le 1.42;$$
$$-0.69 \le (R7 + R8)/(R7 - R8) \le 0.51;$$
$$0.02 \le d7/TTL \le 0.05;$$

where f4 denotes a focal length of the fourth lens;

R7 denotes a curvature radius of a bonding surface of the third lens and the fourth lens; and R8 denotes a curvature radius of an image-side surface of the fourth lens;

d7 denotes an on-axis thickness of the fourth lens.

8. The optical imaging system according to claim 1, wherein an object-side surface of the fifth lens is convex in a paraxial region; and the optical imaging system further satisfies following conditions:

$$0.28 \le f5/f \le 3.02;$$
$$-2.07 \le (R9 + R10)/(R9 - R10) \le -0.30;$$
$$0.01 \le d9/TTL \le 0.03;$$

where f5 denotes a focal length of the fifth lens;

R9 denotes a curvature radius of an object-side surface of the fifth lens;

R10 denotes a curvature radius of a bonding surface of the fifth lens and the sixth lens; and d9 denotes an on-axis thickness of the fifth lens.

9. The optical imaging system according to claim 1, wherein an image-side surface of the sixth lens is concave in a paraxial region; and the optical imaging system further satisfies following conditions:

$$-3.57 \le f6/f \le -0.62;$$
$$-1.50 \le (R10 + R11)/(R10 - R11) \le 1.76;$$
$$0.00 \le d11/TTL \le 0.01;$$

where f6 denotes a focal length of the sixth lens;

R10 denotes a curvature radius of a bonding surface of the fifth lens and the sixth lens;

R11 denotes a curvature radius of an image-side surface of the sixth lens; and d11 denotes an on-axis thickness of the sixth lens.

10. The optical imaging system according to claim 1, wherein an object-side surface of the seventh lens is convex in a paraxial region; and the optical imaging system further satisfies following conditions:

$$0.08 \le f7/f \le 0.92;$$
$$-2.51 \le (R12 + R13)/(R12 - R13) \le 1.09;$$
$$0.01 \le d13/TTL \le 0.02;$$

where f7 denotes a focal length of the seventh lens;

R12 denotes a curvature radius of an object-side surface of the seventh lens;

R13 denotes a curvature radius of a bonding surface of the seventh lens and the eighth lens; and d13 denotes an on-axis thickness of the seventh lens.

11. The optical imaging system according to claim 1, further satisfying following conditions:

$$-1.47 \le f8/f \le -0.09;$$
$$-3.10 \le (R13 + R14)/(R13 + R14) \le 1.70;$$
$$0.00 \le d15/TTL \le 0.01;$$

where f8 denotes a focal length of the eighth lens;

R13 denotes a curvature radius of a bonding surface of the seventh lens and the eighth lens;

R14 denotes a curvature radius of the image-side surface of the eighth lens; and d15 denotes an on-axis thickness of the eighth lens.

12. The optical imaging system according to claim 1, further satisfying following conditions:

$$-8.64 \le f9/f \le -0.36;$$
$$-3.07 \le (R15 + R16)/(R15 - R16) \le 6.41;$$
$$0.00 \le d17/TTL \le 0.01$$

where f9 denotes a focal length of the ninth lens;

R15 denotes a curvature radius of the object-side surface of the ninth lens; and R16 denotes a curvature radius of the image-side surface of the ninth lens.

13. The optical imaging system according to claim 1, wherein an image-side surface of the tenth lens is convex in a paraxial region; and the optical imaging system further satisfies following conditions:

$$0.24 \le f10/f \le 1.33;$$

$$-0.75 \le (R17 + R18)/(R17 - R18) \le 4.17;$$

$$0.01 \le d19/TTL \le 0.04;$$

where f10 denotes a focal length of the ninth lens;

R17 denotes a curvature radius of the object-side surface of the tenth lens;

R18 denotes a curvature radius of the image-side surface of the tenth lens; and d19 denotes an on-axis thickness of the tenth lens.

14. The optical imaging system according to claim 1, wherein an object-side surface of the eleventh lens is concave in a paraxial region; and the optical imaging system further satisfies following conditions:

$$-3.56 \le f11/f \le -0.59;$$

$$-9.90 \le (R19 + R20)/(R19 - R20) \le -0.20;$$

$$0.00 \le d21/TTL \le 0.01;$$

where f11 denotes a focal length of the eleventh lens;

R19 denotes a curvature radius of the object-side surface of the eleventh lens;

R20 denotes a curvature radius of the image-side surface of the eleventh lens; and d21 denotes an on-axis thickness of the eleventh lens.

15. The optical imaging system according to claim 1, wherein an image-side surface of the twelfth lens is convex in a paraxial region; and the optical imaging system further satisfies following conditions:

$$-2.95 \le f12/f \le 2.61;$$

$$-2.34 \le (R21 + R22)/(R21 + R22) \le 3.24;$$

$$0.00 \le d23/TTL \le 0.01;$$

where f12 denotes a focal length of the twelfth lens;

R21 denotes a curvature radius of the object-side surface of the twelfth lens; and R22 denotes a curvature radius of the image-side surface of the twelfth lens.

16. The optical imaging system according to claim 1, wherein the first lens, the second lens, the third lens, the fourth lens, the fifth lens, the sixth lens, the seventh lens, the eighth lens, the ninth lens, the tenth lens, the eleventh lens and the twelfth lens are all made of glass.

\* \* \* \* \*